US012510957B2

(12) United States Patent
Jarvis et al.

(10) Patent No.: US 12,510,957 B2
(45) Date of Patent: *Dec. 30, 2025

(54) WEARABLE ROBOT DATA COLLECTION SYSTEM WITH HUMAN-MACHINE OPERATION INTERFACE

(71) Applicant: Acumino, Renton, WA (US)

(72) Inventors: Patrick McKinley Jarvis, Redmond, WA (US); Ke Wang, Charlottesville, VA (US); Minas Liarokapis, Auckland (NZ); Jayden Chapman, Henderson Valley (NZ); Che-Ming Chang, Hamilton (NZ)

(73) Assignee: ACUMINO, Renton, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/508,989

(22) Filed: Nov. 14, 2023

(65) Prior Publication Data

US 2024/0085974 A1    Mar. 14, 2024

Related U.S. Application Data

(63) Continuation of application No. 17/940,844, filed on Sep. 8, 2022, now Pat. No. 11,822,710.
(Continued)

(51) Int. Cl.
*G06F 3/01* (2006.01)
(52) U.S. Cl.
CPC .............. *G06F 3/011* (2013.01); *G06F 3/014* (2013.01)
(58) Field of Classification Search
CPC ................. G06F 3/011; G06F 3/014; G05B 2219/35448; G05B 2219/35482;
(Continued)

(56) References Cited

U.S. PATENT DOCUMENTS 6,239,784 B1 * 5/2001 Holmes ................ G09B 21/003
345/157
8,965,576 B2    2/2015 Chen et al.
(Continued)

FOREIGN PATENT DOCUMENTS

KR        101797475 B1 *  11/2017
WO      2021101522 A1     5/2021

OTHER PUBLICATIONS

Abdulraham Al-Shanoon, Developing a Mobile Manipulation System to Handle Unknown and Unstructured Objects, Thesis, University of Ontario Institute of Technology, Apr. 2021.
(Continued)

*Primary Examiner* — William Lu
(74) *Attorney, Agent, or Firm* — Orrick, Herrington & Sutcliffe LLP

(57) ABSTRACT

A data collection system that performs data collection of human-driven robot actions for robot learning. The data collection system includes: i) a wearable computation subsystem that is worn by a human data collector and that controls the data collection process and ii) a human-machine operation interface subsystem that allows the human data collector to use the human-machine operation interface to operate an attached robotic gripper to perform one or more actions. A user interface subsystem receives instructions from the wearable computation subsystem that direct the human data collector to perform the one or more actions using the human-machine operation interface subsystem. A visual sensing subsystem includes one or more cameras that collect raw visual data related to the pose and movement of the robotic gripper while performing the one or more actions. A data collection subsystem receives collected data related to the one or more actions.

20 Claims, 10 Drawing Sheets

Related U.S. Application Data

(60) Provisional application No. 63/241,792, filed on Sep. 8, 2021.

(58) Field of Classification Search
CPC .......... G05B 2219/35495; G05B 2219/36436; G05B 2219/36442; G05B 2219/39451; G05B 2219/40116; G05B 2219/40391; B25J 9/1656

See application file for complete search history.

(56) References Cited

U.S. PATENT DOCUMENTS

| | | | |
|---|---|---|---|
| 10,166,680 B2* | 1/2019 | Hemken | B25J 9/163 |
| 10,362,299 B1* | 7/2019 | Niemeyer | G06F 3/011 |
| 10,471,594 B2* | 11/2019 | Bergstra | B25J 9/1656 |
| 10,675,766 B1* | 6/2020 | Niemeyer | B25J 13/025 |
| 10,737,385 B2 | 8/2020 | Shibasaki et al. | |
| 10,768,708 B1* | 9/2020 | Sills | B25J 13/00 |
| 10,905,617 B2* | 2/2021 | Parra | A61N 1/36003 |
| 10,919,152 B1* | 2/2021 | Kalouche | B25J 9/1697 |
| 11,126,405 B1* | 9/2021 | Pasic | G06F 40/211 |
| 11,341,826 B1* | 5/2022 | Wiley | B25J 13/025 |
| 12,282,710 B2* | 4/2025 | King | B25J 3/04 |
| 2010/0092267 A1* | 4/2010 | Najdovski | B25J 13/02 414/7 |
| 2014/0240109 A1* | 8/2014 | Aviles | G06F 3/016 340/407.1 |
| 2016/0059407 A1* | 3/2016 | Sonoda | B25J 9/0081 901/30 |
| 2016/0059412 A1* | 3/2016 | Oleynik | A47J 36/321 700/250 |
| 2016/0256232 A1* | 9/2016 | Awtar | A61B 34/77 |
| 2016/0346923 A1 | 12/2016 | Kesil et al. | |
| 2016/0349835 A1* | 12/2016 | Shapira | G02B 27/017 |
| 2019/0389061 A1* | 12/2019 | Kwak | B25J 9/1605 |
| 2020/0050342 A1* | 2/2020 | Lee | G06F 17/16 |
| 2020/0098181 A1* | 3/2020 | Campbell | G06T 7/248 |
| 2021/0023702 A1* | 1/2021 | Lipay | B25J 15/0009 |
| 2021/0023711 A1 | 1/2021 | Lee et al. | |
| 2021/0068988 A1* | 3/2021 | Ho | A61F 5/013 |
| 2021/0122045 A1* | 4/2021 | Handa | G06T 7/74 |
| 2021/0125052 A1* | 4/2021 | Tremblay | B25J 9/163 |
| 2021/0138655 A1 | 5/2021 | Mousavian et al. | |
| 2021/0237275 A1 | 8/2021 | Stone | |
| 2022/0228710 A1* | 7/2022 | Asbeck | B25J 9/10 |

OTHER PUBLICATIONS

Quan Vuong, Machine Learning for Robotic Manipulation, Jan. 4, 2021.

Shuran Song et al., Grasping in the Wild: learning 6DoF Closed-Loop Grasping from Low-Cost Demonstrations, IEEE Robotics and Automation Letters, Jun. 17, 2020. https://graspinwild.cs.columbia.edu.

Zhenjia Xu et al., AdaGrasp: Learning an Adaptive Gripper-Aware Grasping Policy, Mar. 14, 2021. Retrieved from https://adagrasp.cs.columbia.edu.

International Search Report from corresponding PCT Application PCT/US2022/042936, Dec. 9, 2022.

Examination Report in CA3230947, mailed Aug. 5, 2025, 4 pages.

\* cited by examiner

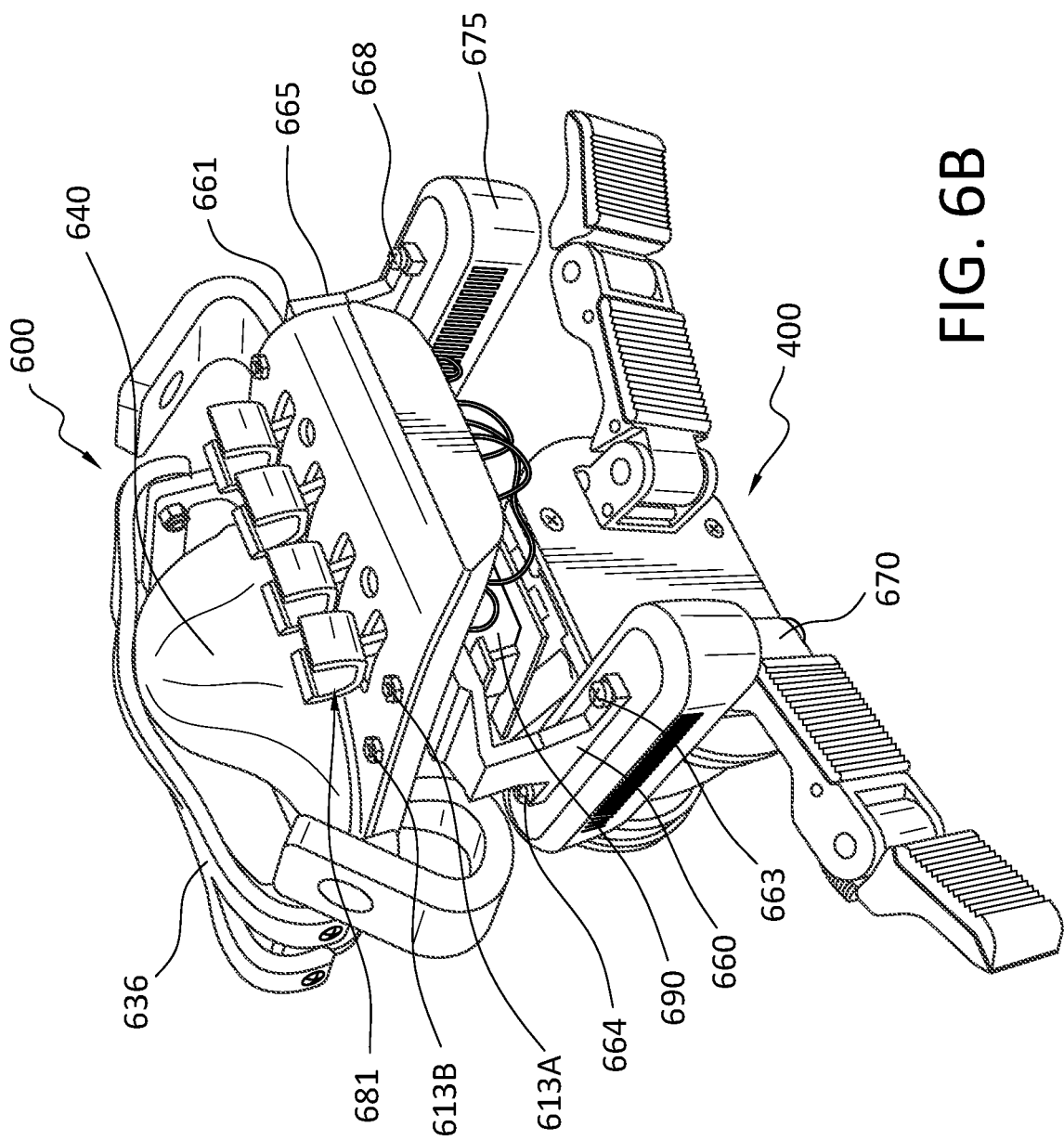

WEARABLE ROBOT DATA COLLECTION SYSTEM WITH HUMAN-MACHINE OPERATION INTERFACE

CROSS-REFERENCE TO RELATED APPLICATIONS

This application claims the benefit of and priority to U.S. patent application Ser. No. 17/940,844, filed on Sep. 8, 2022, which claims the benefit of and priority to U.S. Provisional Patent Application No. 63/241,792, filed on Sep. 8, 2021, both of which are incorporated herein by reference in their entireties.

FIELD OF THE DISCLOSURE

The disclosure relates to a data collection system that performs data collection of human driven robot actions for future robot learning.

BACKGROUND

The range of applications of robotic grasping and manipulation has grown over the past decade spanning from industrial automation to applications in sectors such as service robotics and household automation. Most autonomous robots are generally intended and built to be used in structured environments. However, with the recent advancements in sensors, actuators, design, and control algorithms, the use of simplified actuation schemes, and the incorporation of soft materials in robot grippers and hands, the shift towards compliant, under-actuated devices and simplified actuation methods has also allowed for applications in unstructured and dynamic environments. Such designs increase the efficiency and robustness of robotic end-effectors in executing grasping and manipulation tasks that require significant versatility and dexterity.

Though gripper technologies have advanced significantly, numerous difficulties associated with the autonomous execution of grasping and manipulation tasks remain. Significant research effort has been put into the analysis and synthesis of grasps based on simulations as well as into the execution of task-oriented grasping using both tactile sensing and vision based methods. Control systems have made use of environmental and proprioceptive information as well as analytical methods to process the simulated and real data and generate trajectories for robust grasping and dexterous manipulation. Though such analytical and hybrid approaches (e.g., physics based simulation) have delivered exceptional results in robot grasping and manipulation tasks in structured environments, they often require a highly accurate representation of the real-world environment that is hard or even infeasible to obtain. This further increases the complexity of simulations and the required computational power to generate results. Regarding the available designs, most existing robotic grippers are created to be mounted on robotic manipulators. They can be interfaced to a programmable controller or the manipulator user interface to be programmed for the execution of specific tasks. However, for the experimental validation of robotic gripper and human-machine skill transfer applications, their performance is limited by the reachable workspace of the manipulators that they are mounted on. Portable devices and human machine interfaces that can accommodate and control these grippers allow humans to operate them more directly, intuitively, and efficiently. Using simple handheld interfaces, human operators can directly control the motion of the robotic fingers and with additional sensors, capture the motion and manipulation data required for the execution of complex tasks in both structure and unstructured environments. Additionally, having a portable interface allows grasping and manipulation tasks to be adjusted and programmed outside of lab environments in real-world scenarios with safety. This is particularly useful for testing prototypes in everyday life settings where autonomous operation of a robot that learns from simulated data or experience could pose a health and safety risk. A portable human-machine operation interface also allows for vigorous and faster testing of various functionalities and design aspects of robotic grippers in a more intuitive manner.

Deriving complex in-hand manipulation motions for robotic grippers and hands is an extremely challenging task for both humans and robotic learning methodologies, as it requires the coordination of multiple degrees of freedom with accuracy and precision. Such a task cannot be accomplished with traditional control interfaces such as robotic pendants. New more immersive and intuitive interfaces are needed that offer more direct control of the robot motion and that allow humans to take full advantage of the available robot dexterity. By providing direct-mapped controls for human operation, the human talent and acute problem-solving capabilities can assist in overcoming the computational complexity of calculating the complex robot kinematic and dynamic behaviors of dexterous manipulation. Such intuitive interfaces could also be utilized to test the full capabilities of the developed prototypes and explore new design opportunities.

Accordingly, there is a need for new, more immersive, and intuitive human-machine interfaces that offer more direct control of the robot gripper/hand motions and that allow humans to take full advantage of the available robot dexterity. In addition, there is a need for improved data collection systems to perform data collection of human-driven robot actions for future robot learning.

SUMMARY

Embodiments disclosed herein are related to a data collection system that performs data collection of human-driven robot actions for future robot learning. The data collection system in one embodiment includes five subsystems: 1) a visual sensing subsystem, 2) a User Interface (UI) subsystem, 3) a human-machine operation interface subsystem, 4) a wearable computation subsystem, and 5) a data store subsystem.

In some embodiments, the visual sensing subsystem includes a camera, such as a depth camera, which is located on the human-machine operation interface, a bird-view camera, which may also be a depth camera, which is located on a wall or ceiling of a data collection location, and other camera and types of sensors as needed. All data collected by the various elements of the visual sensing subsystem is collected with regular intervals or triggered by an event during data collection. The collected data is transferred to the wearable computation subsystem and/or the data store subsystem.

In some embodiments, the user interface subsystem is a platform that allows a data collector to communicate with the various other subsystems of the data collection system. In the embodiments, the user interface contains a display monitor, an AR/VR device, a voice user interface, and/or a combination of these devices. The data collector receives and visualizes via the user interface sensing data, instructions, and feedback from the wearable computation subsystem and provides commands via the user interface to the wearable computation subsystem for recording.

In some embodiments, the human-machine operation interface is a forearm mounted human-machine operation interface that is used to operate one or more robotic grippers or hands in the execution of complex grasping and manipulation tasks. The forearm mounted human-machine operation interface includes a forearm stabilizer platform that attaches to a human data collector's forearm. A gripper support arm has a first end coupled to an end of the forearm stabilizer platform. A gripper coupling member is coupled to a second end of the gripper support arm. The gripper coupling member couples the one or more robotic grippers or hands to the forearm mounted human-machine operation interface so that the data collector can operate the one or more robotic grippers or hands with ease. A grip handle is connected to the gripper support arm to provide extra support. The grip handle accommodates at least one input interface that receives user input and provides appropriate control commands to a microcontroller unit to control an operation of the one or more robotic grippers or hands. The forearm mounted human-machine operation interface and/or the one or more robotic grippers and hands include various sensors and control signals that are used for data collection. The collected data is provided to the wearable computation subsystem for recording.

In other embodiments, the human-machine operation interface is a palm mounted human-machine operation interface that is used to operate one or more robotic grippers or hands in the execution of complex grasping and manipulation tasks. The palm mounted human-machine operation interface includes an interface body and a palm support coupled with the interface body. A gripper coupling member is coupled to the interface body. The gripper coupling member connects the one or more robotic grippers or hands to the palm mounted human-machine operation interface so that the data collector can operate the one or more robotic grippers or hands. The palm mounted human-machine operation interface includes at least one input interface that receives user input and provides appropriate control commands to a microcontroller unit to control the operation of the one or more robotic grippers or hands. The palm mounted human-machine operation interface and/or the one or more robotic grippers and hands include various sensors and control signals that are used for data collection. The collected data is provided to the wearable computation subsystem for recording.

In some embodiments, the wearable computation subsystem oversees real-time synchronization of multiple data resources, data processing, and data visualization by providing commands to and receiving collected data from the visual sensing subsystem, the user interface, and the human-machine operation interface. The collected data is sent to the data store subsystem.

In some embodiments, the data store subsystem includes a visual data store and a wearable data store. In operation, all the collected data including sensing data and control signal data is stored in the data store subsystem. The collected data provided by the wearable computation subsystem will be stored in the wearable data store. Data collected by the bird-view camera will be stored in the visual data store. This use of the visual data store is typically useful for the bird-view cameras which cannot connect to the wearable computation subsystem without sacrificing mobility.

These and other features, aspects, and advantages of the present disclosure will become better understood through the following description, appended claims, and accompanying drawings.

BRIEF DESCRIPTION OF THE DRAWINGS

FIGS. 6A and 6B illustrate a palm mounted human-machine operation interface according to embodiments disclosed herein.

Figure 1A:
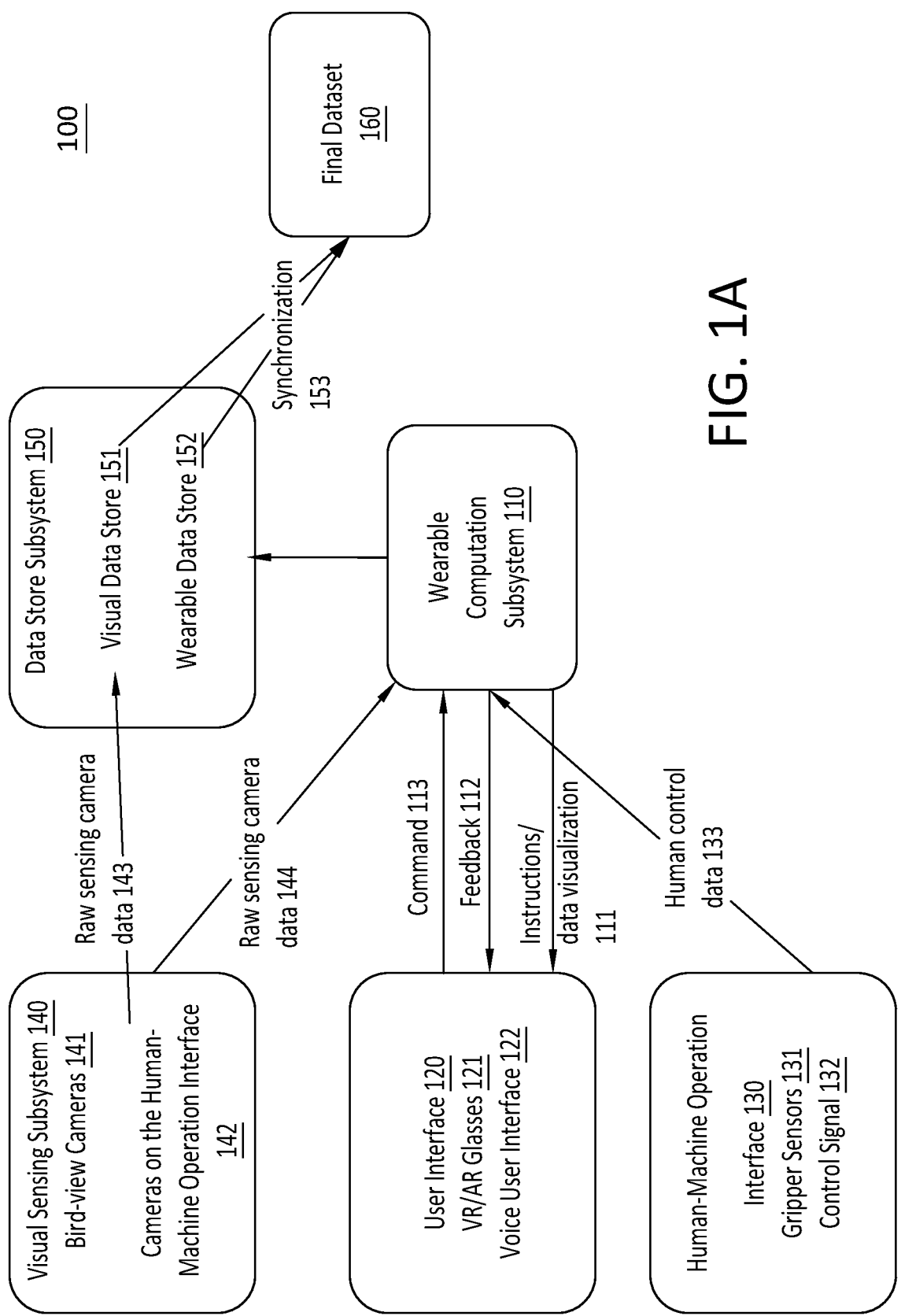
FIGS. 1A and 1B illustrate a data collection system that performs data collection of human-driven robot actions for future robot learning according to embodiments disclosed herein.

The drawing figures are not necessarily drawn to scale. Instead, they are drawn to provide a better understanding of the components thereof, and are not intended to be limiting in scope, but to provide exemplary illustrations.

DETAILED DESCRIPTION OF VARIOUS EMBODIMENTS

A better understanding of the disclosure's different embodiments may be had from the following description read with the drawings in which like reference characters refer to like elements. While the disclosure is susceptible to various modifications and alternative constructions, certain illustrative embodiments are shown in the drawings and are described below. It should be understood, however, there is no intention to limit the disclosure to the specific embodiments disclosed, but on the contrary, the aim is to cover all modifications, alternative constructions, combinations, and equivalents falling within the spirit and scope of the disclosure.

The references used are provided merely for convenience and hence do not define the sphere of protection or the embodiments. It will be understood that unless a term is expressly defined in this application to possess a described meaning, there is no intent to limit the meaning of such term, either expressly or indirectly, beyond its plain or ordinary meaning. Any element in a claim that does not explicitly state "means for" performing a specified function or "step for" performing a specific function is not to be interpreted as a "means" or "step" clause as specified in 35 U.S.C. § 112.

Figure 1B:
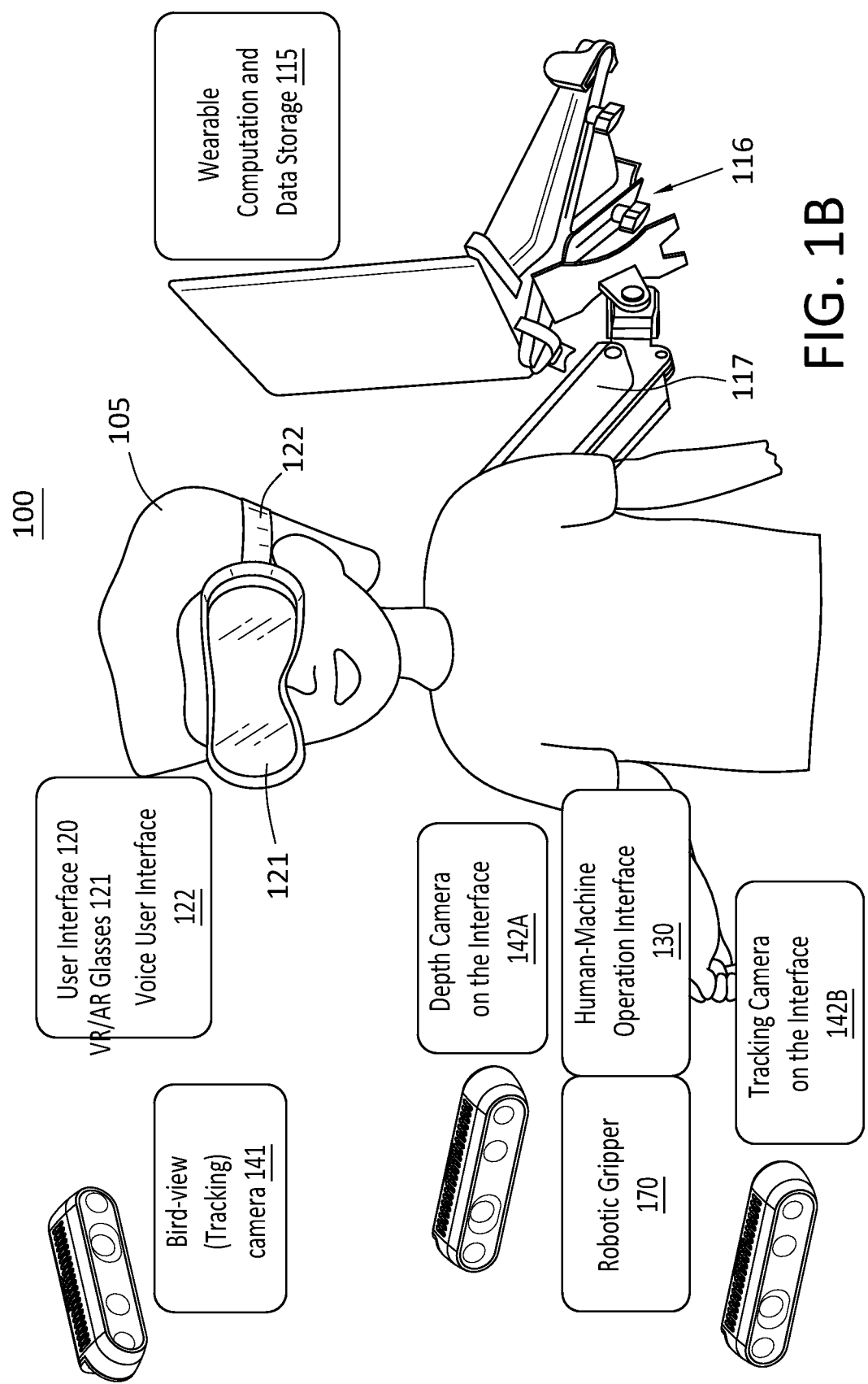

FIGS. 1A and 1B illustrate an example embodiment of a data collection system 100 that performs data collection of human-driven robot actions for future robot learning. As illustrated, the data collection system 100 includes various subsystems that are configured to be used by a data collector 105 when collecting data related to human-driven robot actions for future robot learning. The data collector 105 will typically be a human who wears at least some of the various robotic subsystems while collecting the data as will be explained in more detail to follow. The wearability of the data collection system 100 (or at least some of the subsystems) allows the data collector 105 to mimick actual human action or movement using the robotic end-effector and this can then be recorded and used as data for future robot learning.

As illustrated, the data collection system 100 includes a wearable computation subsystem 110. As illustrated in FIG. 1B, the wearable computation subsystem includes a wearable computation and data storage device 115, which in the embodiments may comprise any reasonable computing system. As illustrated, the wearable computation and data storage device 115 is mounted onto a frame 116 and the frame 116 is connected to an arm member 117 that is configured to be attached to a wearable rig vest that will be described in more detail to follow. Advantageously, the frame 116 and the arm member 117 allow the wearable computation and data storage device 115 to be mounted onto the back of the data collector 105 so as to not impede mobility of the data collector when performing the data collection. In other embodiments, the rig vest may include a backpack like structure that allows the wearable computation and data storage device 115 to be directly mounted onto the rig vest so as to be mounted onto the back of the data collector 105 without the need for the frame 116.

The wearable computation subsystem 110 is the centre of the data collection system 100. In some embodiments, the wearable computation subsystem performs at least the following four functions: 1) real-time synchronization of multiple data resources, 2) data processing, 3) creating data visualization, and 4) communication with a user interface (UI) subsystem 120. The wearable computation subsystem 110 provides timestamps for each piece of incoming data. The timestamps are useful for future time synchronization. The wearable computation subsystem 110 is configured to perform necessary and simple data processing, such as resampling, resizing images, and pose estimation. The processed data is then transferred to a data store subsystem 150. The wearable computation subsystem 110 is also configured to perform simple graphic plotting for real time data visualization. The wearable computation subsystem 110 provides essential information, e.g., pose estimation, target selection, instructions for the UI subsystem 120 to respond to the data collector 105. In addition, the wearable computation subsystem 110 also receives and puts timestamps of the data collector's commands, feedback, and annotations and then transfers this data to the data store subsystem 150. The interactions of the wearable computation subsystem 110 with the subsystems of the data collection system 100 will be described in more detail to follow.

As illustrated, the data collection system 100 also includes the User Interrface (UI) subsystem 120 (also referred to herein as "UI 120"). In embodiments, the UI 120 is a platform that the data collector 105 can use to communicate with the other subsystems of the data collection system 100. The UI 120 is a bidirectional interface. In one side the UI 120 delivers sound and visual information including instructions, confirmations, and previews from the other subsystems of the data collection system 100 to the data collector 105. In some embodiments, the UI 120 may include a display monitor, a VR/AR device that may show camera previews, data curves, and visual demos/instructions or voice prompts. In the other side, the UI 120 collects comments, feedback, and commands from the data collector 105. The UI 120 may involve a voice user interface to listen to the data collector's command or motion command interface through the VR/AR device or other hardware input devices like buttons, keyboard, or a mouse.

As mentioned previously, in some embodiments, the UI 120 includes a Virtual Reality/Augmented Reality (VR/AR) device such as VR/AR glasses 121 and a voice user interface 122. The VR/AR glasses 121 may be any reasonable type of VR/AR glasses that can be used to provide instructions to the data collector 105. The voice user interface 122 may be implemented as earphones or speakers that are part of the VR/AR glasses 121 or that may be separate hardware from the VR/AR glasses 121. In addition, the voice user interface 122 may include a microphone that allows the data collector 105 to provide voice commands and feedback as needed.

In operation, the VR/AR glasses 121 and/or the voice user interface 122 allow the data collector 105 to receive instructions 111 from the wearable computation subsystem 110. For example, in one embodiment the voice user interface 122 allows the user to hear voice instructions as an example of the instructions 111 from the wearable computation subsystem 110. The voice instructions may audibly instruct the data collector 105 to pick up an object of interest such as a cup with a human-machine operation interface 130 and connected robotic gripper 170 and then to move the cup so that the data related to this movement can be collected.

Figure 2A:
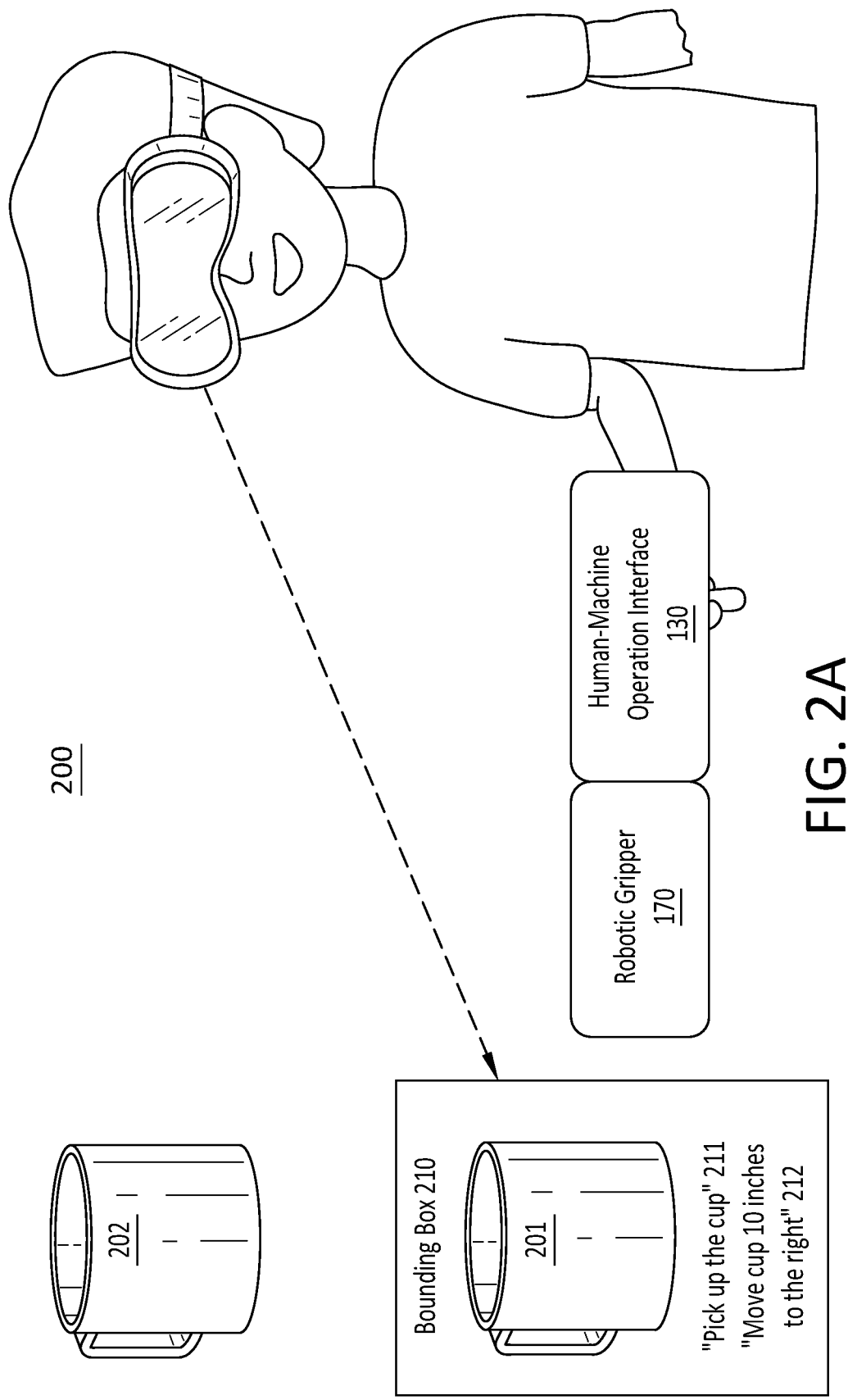
FIGS. 2A and 2B illustrate a data collection environment according to embodiments disclosed herein.

In some embodiments, the instructions 111 may be implemented as data visualization instructions that provide visual instructions to the data collector 105. That is, the visual instructions are generated by the VR/AR glasses 121 so as to be viewable by the data collector 105. For example, FIG. 2A illustrates a data collection environment 200 including a cup 201 and a cup 202. In this embodiment, a data visualization instruction is implemented as a bounding box 210 that surrounds the cup 201, thus informing the data collector 105 that he or she should pick up the cup 201 with the human-machine operation interface 130 and connected robotic gripper 170 and not the cup 202. In addition, the data visualization instructions 111 may also include readable instructions that can be read by the data collector 105. As illustrated, the readable instructions 211 may instruct the data collector to "pick up the cup" and the readable instructions 212 may instruct the data collector to "move the cup 10 inches to the right".

It will be appreciated that there may be any number of readable instructions as circumstances warrant. In some embodiments, a demonstration of how to perform the instructed action such as picking up and moving the cup 201 may be shown to the data collector 105 in the VR/AR glasses 121. This helps ensure that the data collector 105 will be properly trained to carry out the instructed action.

Figure 2B:
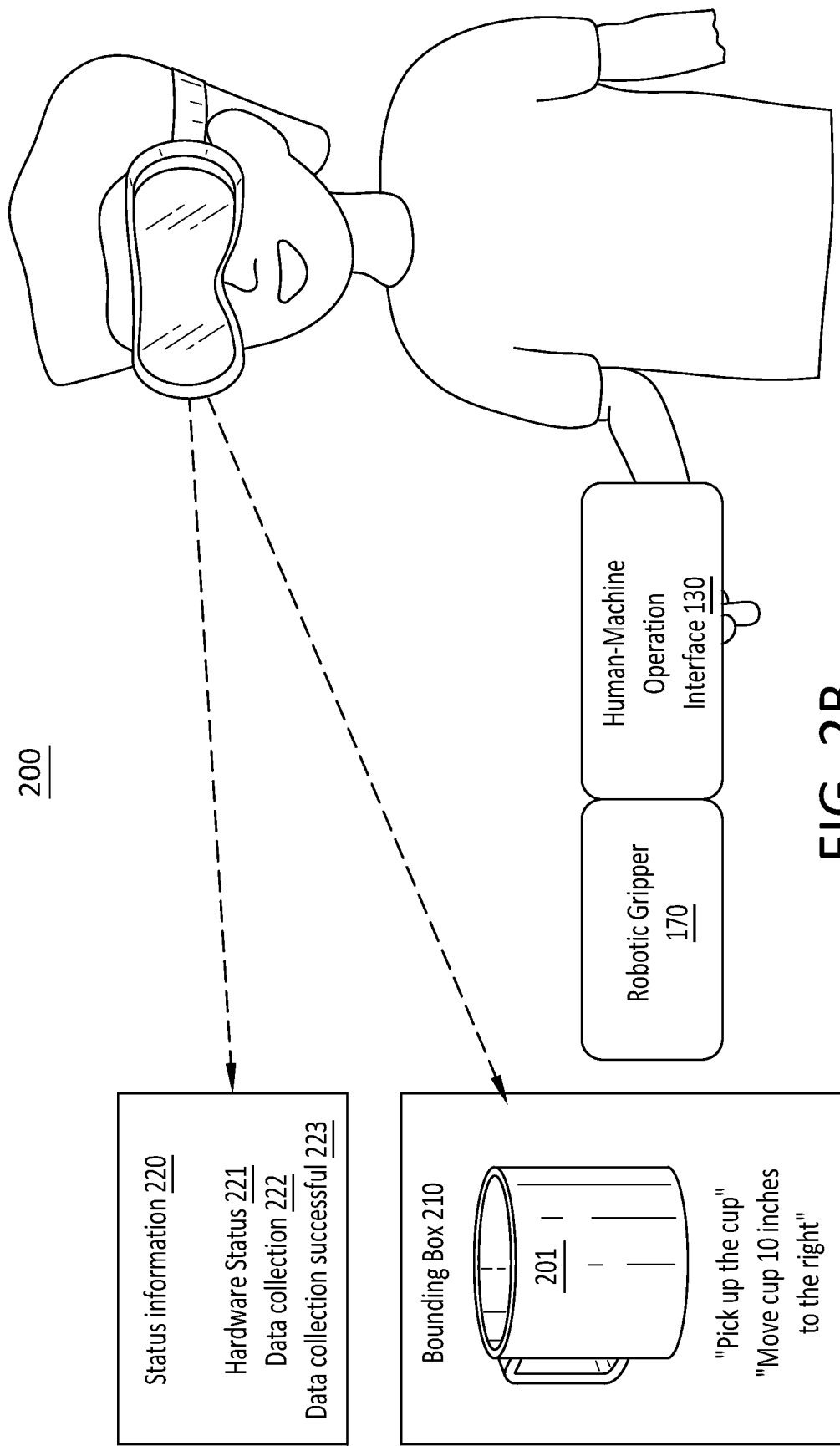

In operation, the VR/AR glasses 121 and/or the voice user interface 122 also allow the data collector 105 to receive feedback 112 from the wearable computation subsystem 110. For example, as shown in FIG. 2B, the data collector 105 receives status information 220, which is a type of feedback 112, about the data collection process from the wearable computation subsystem 110. As illustrated, the status information 220 includes hardware status information 221 that provides information to the data collector 105 about whether the hardware of the various subsystems of the data collection system 100, including the sensors of the human-machine operation interface 130 and attached robotic gripper 170, are properly functioning. For example, suppose that in one instance of data collection, one or more of the sensors of the human-machine operation interface 130 and attached robotic gripper 170 were not functioning properly. This would lead to either no data being collected or being improperly collected. If the data collector 105 is not made aware that the one or more sensors are not functioning properly, then he or she could waste valuable time collecting erroneous data. By informing the data collector 105 of a potential hardware problem, remedial action can be quickly taken and erroneous data collection can be avoided.

The status information 220 also includes data collection status information 222 that provides information to the data collector about the status of the data collection process and how the process is proceeding to completion. For example, the data collection status information 222 may include a checklist of actions that need to be completed in order to perform the data collection task. In some embodiments, the data collection status information 222 may also include prompts to the data collector 105 when an action needs to be repeated. A prompt may also be provided to the data collector 105 when he or she has spent a lot of time between actions so as to instruct the data collector to once again resume the data collection process.

The status information 220 also includes information 223 that informs the data collector that the data collection process has been successfully completed. It will be appreciated that there may be any number of additional status information as circumstances warrant. Although the status information 220 is shown as being generated by the VR/AR glasses 121 to be readable by the data collector 105, in some embodiments the status information 220 may be audibly provided to the data collector 105 via the voice user interface 122.

In some embodiments, the feedback 112 may also include visualization information. For example, as the data collector 105 follows the instructions to move the cup 201 using the human-machine operation interface 130 and attached robotic gripper 170, the bounding box 210 may move with the cup so as to continually surround the cup while the cup is being moved.

The UI 120 also allows the data collector 105 to provide commands 113 to the wearable computation subsystem 110. For example, in one embodiment the data collector 105 may use the voice user interface 122 to provide audio commands such as "begin recording" at the start of a data collection process or at the start of an instructed action or "stop recording" at the end of the data collection process or the end of an instructed action. In another embodiment, the data collector can make a hand gesture that is tracked by the VR/AR glasses 121 to start and stop recording at the start and completion of the data collection process and/or the start and completion of an instructed action. In still other embodiments, a QR code that is located in the data collection location and that can be scanned by the VR/AR glasses 121 can be provided to start and stop recording at the start and completion of the data collection process and/or the start and completion of an instructed action. In further embodiments, a button or other user interface element can be included on the human-machine operation interface 130 that is pushed to start and stop recording at the start and completion of the data collection process and/or the start and completion of an instructed action. It will be appreciated that the command 113 may provide other types of feedback to the wearable computation subsystem 110 in addition to the command to start and stop recording. It will also be appreciated that the various implementations of the command 113 allows the data collector 105 to communicate and provide feedback to the wearable computation subsystem 110 without actually touching a button or the like on the wearable computation subsystem 110. As discussed above, the wearable computation subsystem 110 is worn on the back of the data collector 105 to ensure the wearable computation subsystem 110 does not impede the human-machine operation interface 130 and attached robotic gripper 170 during the data collection process.

As illustrated, the data collection system 100 includes the human-machine operation interface 130. The human-machine operation interface 130 includes various gripper sensors 131, some of which are connected to the human-machine operation interface 130 and some of which are connected to the attached robotic gripper 170. The gripper sensors 131 may include distance sensors and localization sensors that measure the movement of the human-machine operation interface 130 and/or the robotic gripper 170. The gripper sensors 131 may measure a change in peak current of one or more motors that are configured to move the fingers of the robotic gripper 170. The data that is measured by the various gripper sensors 131 is then sent as human control data 133 to the wearable computation subsystem 110.

The human-machine operation interface 130 may also measure control signals 132 that are used to control the various operational elements of the human-machine operation interface. For example, the human-machine operation interface 130 may include one or more buttons, triggers, potentiometers, or other user input devices that are activated by the data collector 105 when he or she performs an instructed action or task. The activation by the data collector 105 may generate the control signals 132. In one embodiment, a control signals 132 may be the pressure that is exerted when the button is activated. The control signals 132 are then sent as human control data 133 to the wearable computation subsystem 110.

As illustrated, the data collection system 100 includes the visual sensing subsystem 140. The visual sensing subsystem 140 includes cameras for collecting raw sensing camera data. The cameras include depth cameras, tracking cameras, and RGB cameras on the human-machine operation interface and/or fixed-locations like bird-view cameras. In one embodiment, one or more bird-view cameras 141 are implemented in a fixed location on a wall or ceiling of the location where the data collection process is occurring. The one or more bird-view cameras can be a tracking camera such as an Intel T265 camera. In operation, the one or more bird-view cameras 141 may provide the raw sensing camera data 143 to a visual data store 151 of the data store subsystem 150 and/or may provide raw sensing camera data 144 to the wearable computation subsystem 110. In other embodiments, the visual sensing subsystem 140 also includes various cameras 142 that are included on the human-machine operation interface 130. In one embodiment, the various cameras 142 include at least one depth camera 142A such as an Intel D435 that is mounted on a top surface of the human-machine operation interface 130 and at least one one tracking camera 142B such as an Intel T265 that is mounted on a bottom side of the human-machine operation interface 130. These cameras are mounted onto the human-machine operation interface 130 as will be explained in more detail to follow. In operation, the one or more cameras 142 may provide the raw sensing camera data 143 to the visual data store 151 of the data store subsystem 150 and/or may provide raw sensing camera data 144 to the wearable computation subsystem 110.

In operation, the raw sensing camera data 143 and/or 144 may include position (RGB and depth) data of the human-machine operation interface 130 and its related robotic gripper 170 when the data collector 105 moves the machine operation interface 130 and its related robotic gripper 170 while preforming one or more of the instructed actions or tasks. This data is collected by the at least one bird-eye view depth camera and/or the depth camera implemented on the human-machine operation interface 130. This data may be collected as video data and collected on a frame-by-frame basis.

The raw sensing camera data 143 and/or 144 may also include pose data that tracks a pose of the robotic gripper 170 while performing one or more of the instructed actions or tasks. This data is collected by the bird-eye tracking camera and/or the tracking camera implemented on the human-machine operation interface 130. The pose data may include the pose of the gripper 170 in 3D space including X,Y,Z coordinates and their related angles.

As illustrated, the data collection system 100 includes the data store subsystem 150. The data store subsystem 150 may be implemented as part of the wearable computation subsystem 110 or it may be implemented as a separate computing system. In one embodiment, the data store subsystem 150 may be partially implemented on the wearable computation subsystem and partially implemented on the separate computing system. For example, the visual data store 151 may be implemented on the separate computing system and the wearable data store 152 may be implemented on the wearable computation subsystem 110. This is advantageous as for mobility reasons there may be no easy way to connect the visual sensing subsystem to the wearable computation subsystem. As previously described, all data that is collected by the various subsystems of the data collection system 100 are sent to the data store subsystem 150 for storage. As described, the data collected by the visual sensing subsystem 140 is stored in the visual data store 151 and the data that is collected by the wearable computation subsystem 110 is stored in the wearable data store 152.

As illustrated, the data stored in the data store subsystem 150 undergoes a synchronization step 153 that synchronizes the data stored in the visual data store 151 to the data stored in the wearable data store 152 after the data collection process is completed to generate a complete final synchronized dataset 160. The complete final synchronized dataset 160 may then be used in a future process to train one or more robots to mimic human behaviour.

Figure 3A:
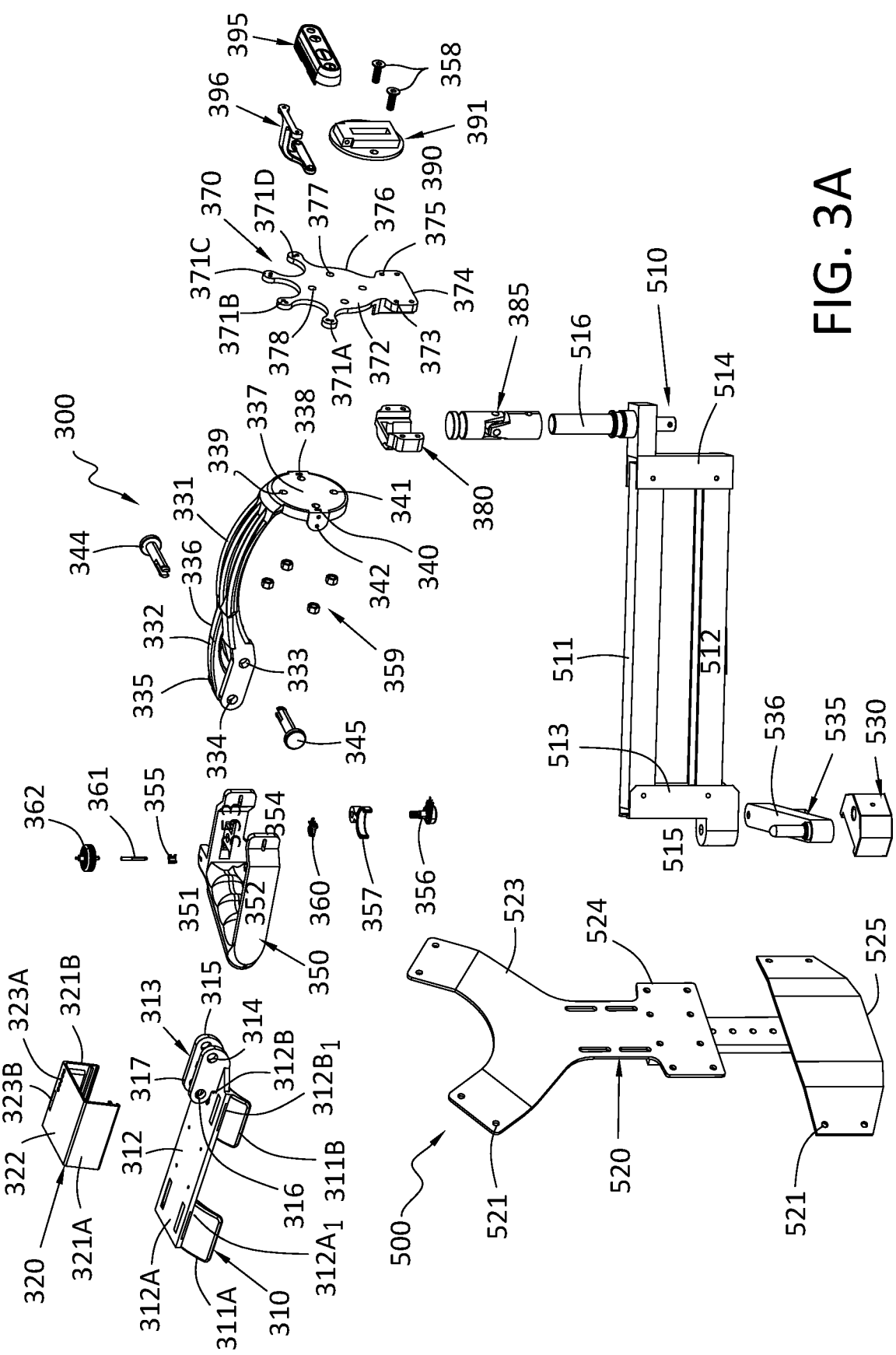
FIGS. 3A and 3B illustrate a forearm mounted human-machine operation interface according to embodiments disclosed herein.
Figure 3B:
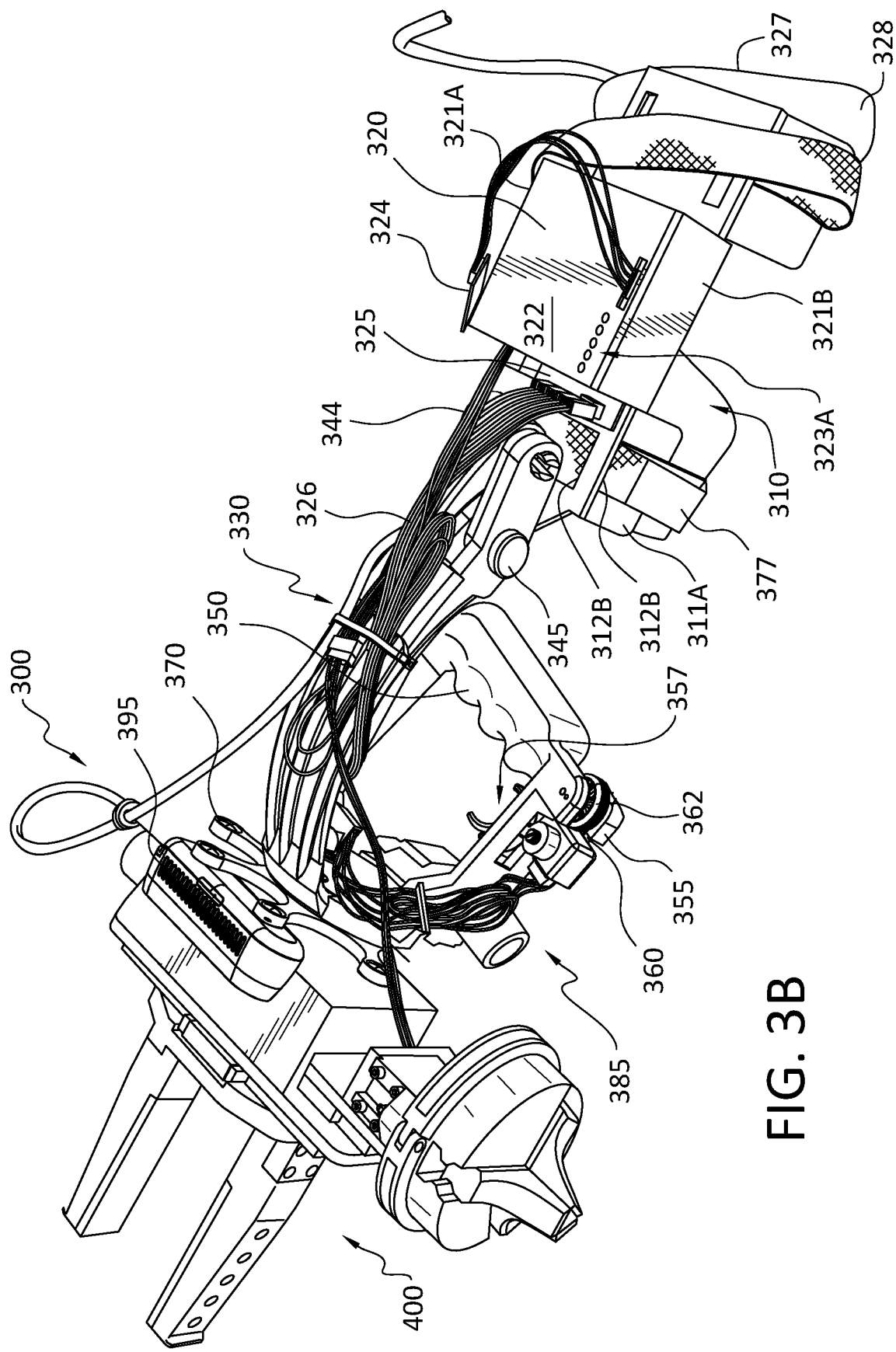

Specific embodiments of the human-machine operation interface 130 and the attached robotic gripper 170 will now be explained. FIGS. 3A and 3B illustrate an embodiment of a forearm mounted human-machine operation interface 300, which corresponds to the human-machine operation interface 130. These figures also show components configured to be attached to the forearm mounted human-machine operation interface 300 or to help stabilize the interface as will be explained. The forearm mounted human-machine operation interface 300 is configured to assist a user while operating a robotic gripper or hand 400 and to help reduce a user's arm fatigue while operating a robotic gripper or hand 400. The robotic gripper or hand 400 corresponds to the robotic gripper 170. The forearm mounted human-machine operation interface 300 creates space around a user's hand so as to facilitate the operation of the interface using the included input interfaces while the forearm mounted human-machine operation interface 300 is resting on a user's forearm.

As shown in FIGS. 3A and 3B, the forearm mounted human-machine operation interface 300 may include a forearm stabilizer platform 310, which may be constructed of any reasonable material such as a metal or a plastic. In the embodiment, the forearm stabilizer platform 310 may include a rectangular shaped platform portion 312 that is configured to support an electronics circuit board such as the electronics circuit board 324. The forearm stabilizer platform 310 may also include a connection portion 313 that is located on one end of the rectangular shaped platform portion 312. The connection portion 313 includes connection holes 314, 315, 316, and 317 that are used to connect the forearm stabilizer platform 310 to a gripper support arm 330 as will be explained in detail to follow.

The forearm stabilizer platform 310 may also include a first downward extending portion 311A and a second downward extending portion 311B that extend downward from the rectangular shaped platform portion 312. Although not illustrated due to the orientation of FIGS. 3A and 3B, the forearm stabilizer platform 310 may also include a third and fourth downward extending portions that are on opposite sides of the rectangular shaped platform portion 312 from the downward extending portions 311A and 311B and that also extend downward from the rectangular shaped platform portion 312. The four downward extending portions are shaped so as to conform to and rest on a user's forearm when in use. As shown in FIG. 3B, in some embodiments padding 328, which may be any reasonable padding such as a cloth sponge, may be attached to the four downward extending portions to increase comfort for a user who wears the forearm mounted human-machine operation interface 300.

The rectangular shaped platform portion 312 may include a first opening 312A that has a first slot 312A1 and a second, non-illustrated slot that is on an opposite side to the first slot 312A1. The rectangular shaped platform portion 312 may also include a second opening 312B that has a first slot 312B1 and a second, non-illustrated slot that is on an opposite side to the first slot 312B1. As shown in the figures, the various slots may be located adjacent to the downward extending portions 311A and 311B. As shown in FIG. 3B, the first and second openings 312A and 312B and their associated slots may be used to receive fastening straps 327 that may be made of Velcro or any other reasonable material, and that are configured to secure the forearm mounted human-machine operation interface 300 to the forearm of a user so that the interface is properly supported on the forearm of the user/operator when in use.

As discussed previously, the electronics circuit board 324 may be placed on the top side of the rectangular shaped platform portion 312 such that the electronics circuit board 324 is supported by the rectangular shaped platform portion 312. To protect the electronics circuit board, in some embodiments the forearm mounted human-machine operation interface 300 may include electronics cover or housing 320, which may be constructed of any reasonable material such as a metal or a plastic. The electronics cover or housing 320 may include a central portion 322 and a first sidewall 321A and a second sidewall 321B that both extend from the central portion.

As shown in FIG. 3B, the electronics cover or housing 320 is configured so that the sidewalls 321A and 321B fit around and are secured to the rectangular shaped platform portion 312 between the extending portions 311 to thereby protect the electronics circuit board 324 when present. As further illustrated, the electronics cover or housing 320 may include indicator LEDs 323A that are configured to connect with some of the electronics on the electronics circuit board 324 and light-up when the electronics are being used or otherwise supplied with a power source to indicate the operation state or other important information, pertaining to the operation of the device. In addition, electronics cover or housing 320 may also include an opening 323B that is configured to allow various electrical wires to connect to the electronic components of the electronics circuit board 324. In some embodiments, the electronics cover or housing 320 may not cover an interface portion 325 of the electronics circuit board 324 so as to allow various electrical wiring 326 to run from the electronics circuit board 324 and other elements of the forearm mounted human-machine operation interface 300. It will be appreciated that the electronics circuit board 324 may include various types of electronics such as a computing unit, control circuitry, and the like that can be used to control the various elements of the forearm mounted human-machine operation interface 300 and the robotic gripper or hand 400 that is attached to the human-machine operation interface 300. In addition, the various electronics can be used to collect and plot in real-time data about the usage of the forearm mounted human-machine operation interface 300 and the connected robotic gripper or hand 400.

As shown in FIGS. 3A and 3B, the forearm mounted human-machine operation interface 300 may include a gripper support arm 330, which may be constructed of any reasonable material such as a metal or a plastic. In the embodiment, the gripper support arm 330 includes a central portion 331 that may have a curved shape and a connection portion 332 located at a first end of the central portion 331. The connection portion 332 includes a first connection hole 333, a second connection hole 334, a third connection hole 335 that is on the opposite side of the connection portion from the first connection hole 333, and a fourth connection hole that is on the opposite side of the connection portion from the second connection hole 334.

In this embodiment, the connection portion 332 cooperates with the connection portion 313 to connect the gripper support arm 330 and the forearm stabilizer platform 310. Specifically, the connection portion 332 is inserted into the connection portion 313 so that the connection holes 316 and 334 align, the connection holes 317 and 335 align, the connection holes 314 and 333 align, and the connection holes 315 and 336 align. A first quick slot peg or some other suitable connection member 344 is configured to be inserted into the connection channel created by the alignment of the connection holes 316, 317, 334, and 335 to thereby secure the gripper support arm 330 to the forearm stabilizer platform 310. A second quick slot peg or some other suitable connection member 345 is configured to be inserted into the connection channel created by the alignment of the connection holes 314, 315, 333, and 336 to further secure the gripper support arm 330 to the forearm stabilizer platform 310. The second quick slot peg 345 is also configured to function as a locking mechanism so that removal of the second quick slot peg 345 allows for the execution of wrist flexion/extension motion.

In the embodiment, the gripper support arm 330 includes a mount portion 337 that is located on a second end of the central portion 331. The mount portion 337 includes various mounting holes 338, 339, 340, 341, and 342 that are configured to mount various other elements to the gripper support arm 330 as will be explained.

As shown in FIGS. 3A and 3B, the forearm mounted human-machine operation interface 300 may include grip handle 350. The grip handle 350 may include a central grip portion 351 that includes an ergonomic grip for providing comfort to a user's fingers when using the grip handle 350 to control the forearm mounted human-machine operation interface 300. The grip handle 350 also includes a first side portion 352 and a second side portion 353 that are connected to the central grip portion 351. An extending portion 354 extends from the second side portion 353 and is used to help connect the grip handle 350 to the gripper support arm 330. The connection between the grip handle and the support arm is achieved using a bolt and nut on either side of the gripper support arm panel along a swivel axis. The grip handle 350 connector has a slit to allow adjustment of the handle position. A secondary bolt and nut can be installed in the hole 342 to lock the grip handle 350 in position. Otherwise, the grip handle 350 can be swiveled around the swivel axis by loosening the connecting bolt and nuts.

In the embodiment, the grip handle 350 is also configured to have several input interfaces mounted thereon. For example, a push button 355, which may be a 6 mm push button, may be mounted onto the first side portion 352 using any reasonable attachment mechanism. In addition, a rotary potentiometer 356 may also be mounted onto the first side portion 352. The rotary potentiometer 356 may include a shaft or rotation member that is configured to be connected to a trigger member 357 via a hole of the trigger member. The trigger member 357 allows the user to adjust the potentiometer as needed when controlling the attached robotic gripper or hand 400. In some embodiments, the trigger member 357 may be replaced with a slider control or other suitable member that is configured to adjust the rotary potentiometer 356. The rotary potentiometer 356 and trigger member 357 may be attached to the grip handle 350 using any reasonable fasteners such as the screws 358 and nuts 359 shown in FIGS. 3A and 3B.

In the embodiment, a 12-pulse incremental encoder 360 may also be mounted onto the first side portion 352. The incremental encoder 360 may include an encoder wheel shaft 361 that connects a scroll wheel 362 to the incremental encoder 360. The scroll wheel 362 allows the user to control the incremental encoder 360 as needed when controlling the attached robotic gripper or hand 400. The incremental encoder 360 and the scroll wheel 362 may be attached to the grip handle 350 using any reasonable fasteners such as the screws 358 and nuts 359 shown in FIGS. 3A and 3B.

As shown in FIGS. 3A and 3B, the forearm mounted human-machine operation interface 300 may include a universal joint adaptor 380 that is configured to mount a universal joint 385 to the gripper support arm 330. The universal joint adaptor 380 includes connection holes that are used to mount the adaptor to the gripper support arm 330 using any reasonable fasteners. The universal joint 385 is configured to allow for the forearm mounted human-machine operation interface 300 to couple with an iso-elastic arm 510 of a wearable vest rig 500 that is designed to provide further support to the forearm mounted human-machine operation interface 300 and thus function as a support structure as will be explained in more detail to follow.

As shown in FIGS. 3A and 3B, the forearm mounted human-machine operation interface 300 may include a camera mount adaptor 370 that is configured to mount one or more cameras, such as the camera 395 that in mounted on a top surface of the camera mount adaptor 370. Although not illustrated, a second camera may be mounted on a bottom surface of the camera mount adaptor 370. The camera mount adaptor 370 may include a first arm 371A, a second arm 371B, a third arm 371C, and a fourth arm 371D or even more arms. Each of the arms 371 may include a corresponding hole that may be used to mount a camera such as the camera 395. In the embodiment, the four arms 371 are able to accommodate one camera as shown in FIG. 3B or they may accommodate two cameras in a V shape. It will be appreciated that in other embodiments the camera mount adaptor 370 may be of other reasonable shapes that are configured to host different angles or numbers of cameras. The camera 395 is used as a vision capture device for observing the operation of the attached robotic gripper or hand 400. The camera 395 may be attached to the holes of one or more of the arms 371A-371D by any reasonable fasteners such as the screws 358 and nuts 359. In some embodiments, a camera offset mount 396 may be implemented in place of or in conjunction with the camera mount adaptor 370. The camera offset mount 396 may attach to the camera mount adaptor 370 or directly to the gripper support arm 330. The camera offset mount 396 may be secured to the camera and the camera mount adaptor 370 by sets of embedded nuts and bolts. The camera offset mount 396 has nut housing cavities for connections with the camera mount adaptor 370 and thin through hole plates for direct bolt and screw mounting to the body of cameras 395. This design allows the use of the same screws to be used when mounting the camera with and without the camera offset mount 396.

The camera mount adaptor 370 also includes various connection holes 372-378 that are used to connect the camera mount adaptor 370 to other elements of the forearm mounted human-machine operation interface 300. For example, the connection holes 372-378 may couple with the connection holes 338-341 of the mount portion 337 to thereby mount the camera mount adaptor 370 to the gripper support arm 330 using any reasonable fasteners such as the screws 358 and nuts 359.

In the embodiment, a gripper coupling member 390 is configured to attach to a side of the camera mount adaptor 370 that is opposite of the side that attaches to the mount portion 337. The gripper coupling member 390 attaches to the camera mount adaptor 370 using one or more of the connection holes 372-378 that couple with various connection holes of the gripper coupling member 390 that are not shown in the figures.

The gripper coupling member 390 includes a coupling portion 391 that is configured to couple with a coupling portion of one or more robotic grippers or hands 400. It will be appreciated that in some embodiments, a particular gripper coupling member 390 may be configured for a particular type or model of robotic grippers or hands 400. Thus, in such embodiments, one gripper coupling member 390 may be exchanged for another gripper coupling member 390 when a different type or model of robotic grippers or hands 400 is to be used. Thus, the forearm mounted human-machine operation interface 300 is not limited to operating only one type or model of robotic grippers or hands 400. Rather, the forearm mounted human-machine operation interface 300 is configured to operate a variety of robotic grippers or hands 400 using an appropriate gripper coupling member 390.

Figure 4:
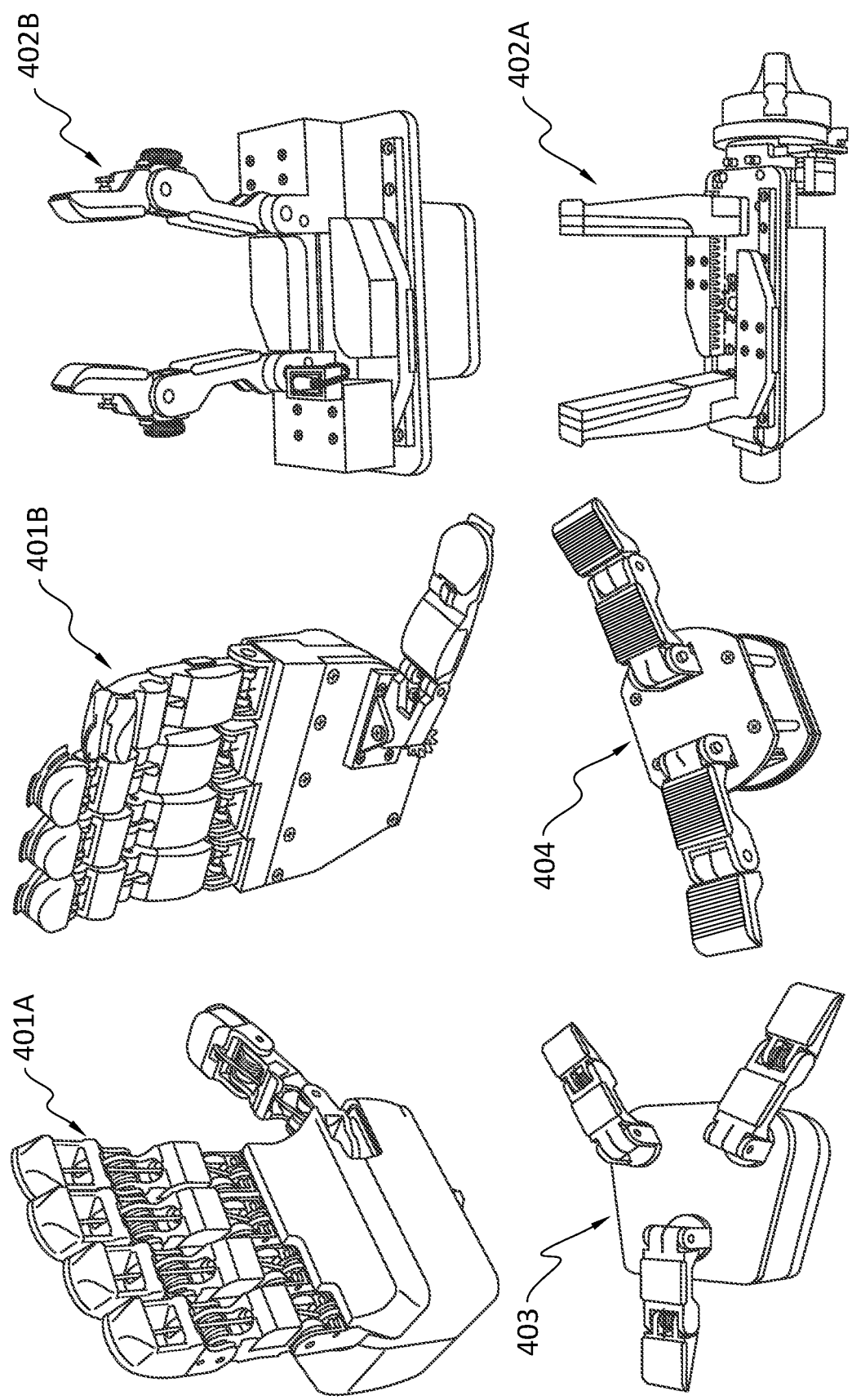
FIG. 4 illustrates various robotic grippers or hands that may be operated by the forearm mounted human-machine operation interface and/or the palm mounted human-machine operation interface disclosed herein.

FIG. 4 illustrates some example robotic grippers or hands 400 that may be operated by the forearm mounted human-machine operation interface 300 or a palm mounted human-machine operation interface 600 to be described later. As illustrated, the robotic gripper or hand 400 may be an anthropomorphic gripper 401A or 401B that include five fingers that are similar to those of a human hand and that have various different joints that are bendable according to commands received from the human-machine operation interface. The robotic gripper or hand 400 may be a multi-modal parallel gripper 402A (as is also illustrated in FIG. 3B) or 402B that has two moving fingers each having various different joints that are bendable according to commands received from the human-machine operation interface. The robotic gripper or hand 400 may also be an open handed gripper 403 with three fingers. The robotic gripper or hand 400 may be an open handed gripper 404 with two fingers. It will be appreciated that the robotic grippers or hands 400 shown in FIG. 4 are examples only and that other types of reasonable robotic grippers or hands 400 may also be operated by the forearm mounted human-machine operation interface 300 or palm mounted human-machine operation interface 600.

Figure 5:
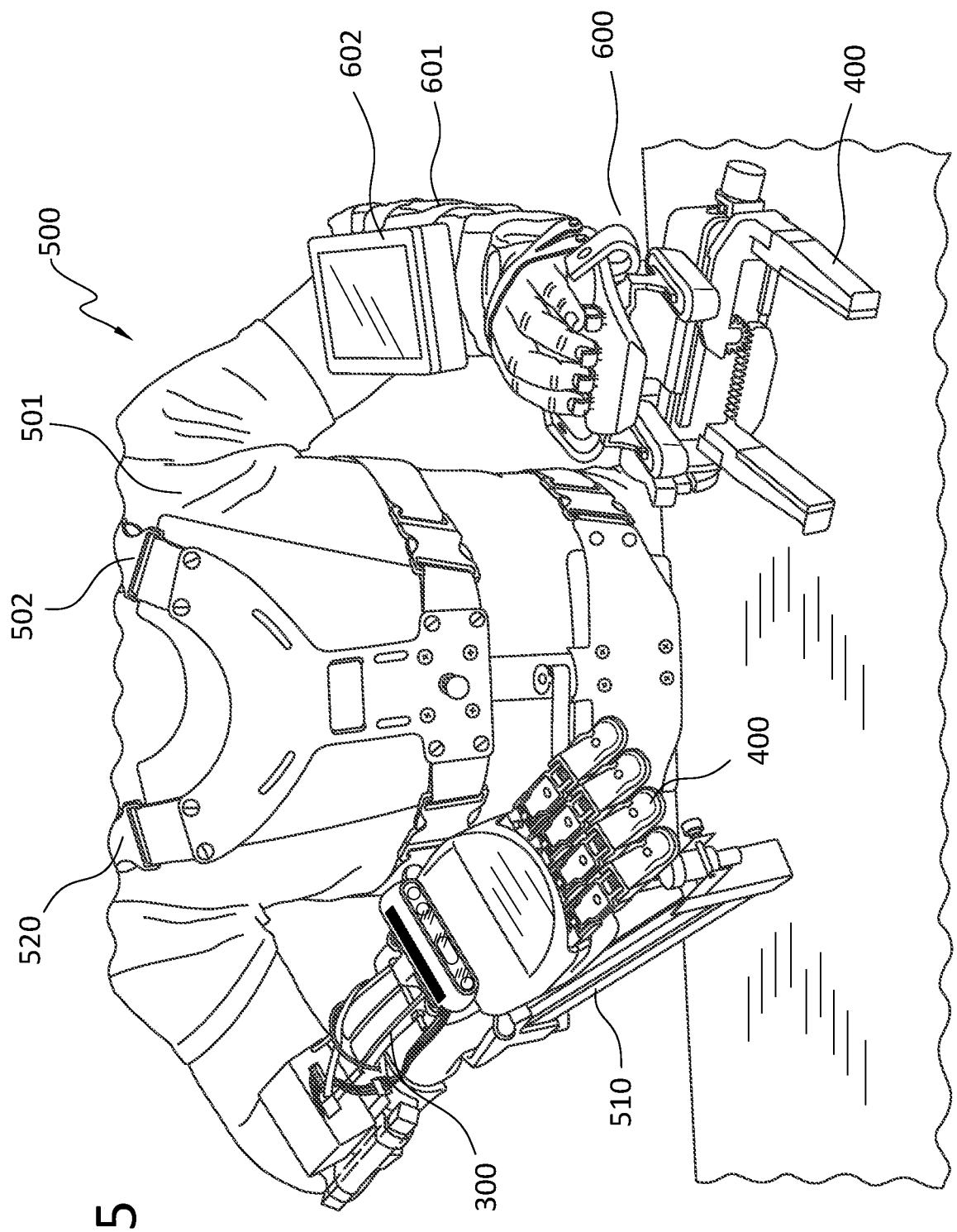
FIG. 5 illustrates aspects of the forearm mounted human-machine operation interface and the palm mounted human-machine operation interface disclosed herein.

FIG. 5 illustrates an embodiment of the vest rig 500 that is configured to support the forearm mounted human-machine operation interface 300. The vest rig 500 includes a garment 501 designed to be worn by the user. The garment 501 includes various buckles 502 that are configured to secure the vest rig to the user. Although not illustrated, the back of the vest rig 500 may provide mounting space for one or more of power electronics, external data storage, step-up converters for added power for the various robotic grippers or hands 400, and an on-board computer, such as the wearable computation and data storage device 115 of the wearable computation subsystem 110.

The vest rig 500 may include a rig frontal mounting plate 520 that is configured to attach to the garment 501. The rig frontal mounting plate 520 may include various connection holes 521 that are used to attach the rig frontal mounting plate 520 to the garment 501 via buckles 502 as shown in FIG. 5. As shown in FIG. 3A, the rig frontal mounting plate 520 is formed of a Y shaped upper portion 523, a mid-section plate portion 524 that connects to upper portion 523, and a waist portion 525 that connects to the plate portion 524 and is positioned at the waist of the vest rig 500. The waist portion 525 includes an arm mounting block 530 for mounting a first end of an extender arm 535 that extends from the waist portion 525 and has a shaft 536 on a second end for mounting the iso-elastic arm 510.

In the embodiment, the iso-elastic arm 510 may be mounted from the waist portion 525 of the vest rig 500 and is configured to provide support for the weight of the forearm mounted human-machine operation interface 300 and the attached robotic gripper or hand 400 to thereby reduce user fatigue when operating the robotic gripper or hand 400. The iso-elastic arm 510 may comprise a first horizontal bar portion 511 and a second horizontal bar portion 512 that extend out from the vest rig 500 and that are separated by a first vertical bar portion 513 and a second vertical bar portion 514 to thereby form a space between the first and second bar horizontal portions as shown in FIG. 1A. The iso-elastic arm 510 includes a mounting portion 515 that includes a hole that is configured to couple to the shaft 536 of the extender arm 535 to thereby mount the iso-elastic arm 510 to the waist portion 525.

The iso-elastic arm 510 may also include a mounting pin 516 that extends upward from the first horizontal bar portion 511. The mounting pin 516 is configured to couple with universal joint 385 of the forearm mounted human-machine operation interface 300. This allows for the forearm mounted human-machine operation interface 300 to be removed as needed from the vest rig 500 so that actions such as changing from one type of robotic gripper or hand 400 to another type can be performed.

Figure 6A:
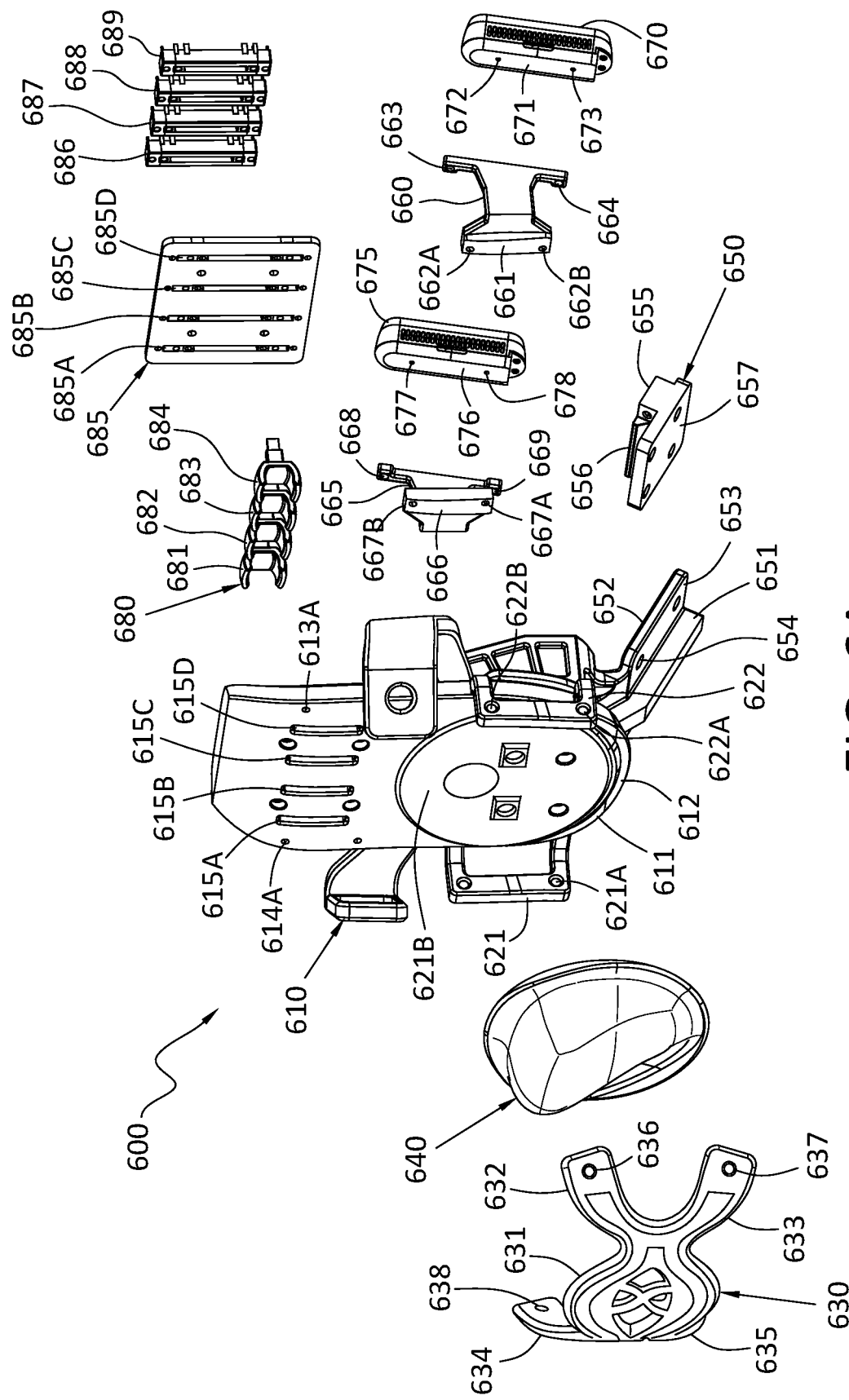

FIGS. 6A and 6B illustrate an embodiment of a palm mounted human-machine operation interface 600, which corresponds to the human-machine operation interface 130. These figures also show components configured to be attached to the palm mounted human-machine operation interface 600 or to help stabilize the interface as will be explained. The palm mounted human-machine operation interface 600 is configured to assist a user while operating a robotic gripper or hand 400 while using the palm of the hand to constrain the system to the hand of the user while operating a robotic gripper or hand 400. The palm mounted human-machine operation interface 600 allows the user to hold the device without requiring the user's fingers to provide support, thereby leaving the user's fingers free to operate various input interfaces to control the operation of the robotic gripper or hand 400.

As shown in FIGS. 6A and 6B, the palm mounted human-machine operation interface 600 may include an interface body 610, which may be constructed of any reasonable material such as a metal or a plastic. In the embodiment, the interface body 610 may include a palm support mount portion 611 that is located on one end of the interface body. The palm support mount portion 611 may include machined ridge 612 that is shaped to receive a palm support 640. The palm support mount portion 611 may include components that are configured to secure the palm support 640 to the interface body 610.

The palm support 640 may include a raised central portion that is designed to be ergonomically comfortable to the user when operating the robotic gripper or hand 400. Thus, the palm support 640 may be constructed of any reasonable material that is able to conform to the human palm in a comfortable manner while also providing sufficient support. The palm support 640 also includes a ring portion that is configured to couple with the machined ridge 612 so that the palm support 640 is securely mounted onto the interface body 610.

In the embodiment, the interface body 610 is coupled to a first elastic wrist strap mount 621 and a second wrist mount 622 that extend upward from the interface body 610 and are configured to mount an elastic wrist strap 630. As shown in FIG. 6A, the first elastic wrist strap mount 621 is connected to the interface body mount by fasteners 621A and 621B which are inserted into corresponding connection holes of both the first elastic wrist strap mount 621 and the interface body 610. Although not shown in the figures, the second elastic wrist strap mount 622 is connected to the interface body mount by fasteners which are inserted into corresponding connection holes of both the second elastic wrist strap mount 622 and the interface body 610. The second elastic wrist strap mount 622 includes connection holes 622A and 622B that are configured to couple with connection holes of the elastic wrist strap 630 to secure elastic wrist strap to the second elastic wrist strap mount 622. Although not illustrated, the first elastic wrist strap mount 621 has corresponding connection holes for coupling to the elastic wrist strap 630.

The elastic wrist strap 630 may be made of any reasonable elastic material and is configured to go over the backside of a user's hand as shown in FIG. 5 to secure the palm of the user to the palm mounted human-machine operation interface 600 when operating the robotic gripper or hand 400. The elastic wrist strap 630 may include a central portion 631 that goes over the backside of the user's hand. A first arm 632 and second arm 633 may extend from the central portion 631 and may include connection holes 636 and 637 respectively for connecting the elastic wrist strap 630 to the elastic wrist strap mount 621 or 622. Likewise, a third arm 634 and fourth arm 635 may extend from the central portion 631 and may include connection hole 638 for third arm 634 and an unillustrated connection hole for fourth arm 635 for connecting the elastic wrist strap 630 to the elastic wrist strap mount 621 or 622. When mounting to the palm mounted human-machine operation interface 600, the connection holes 636 and 637 may couple with the connection holes 622A and 622B and be secured by any reasonable fastener and the connection hole 638 and the unillustrated connection hole for the fourth arm 635 may couple with the unillustrated connection holes of the first elastic wrist strap mount 621 and be secured by any reasonable fastener as shown in FIG. 6B.

As shown in FIGS. 6A and 6B, the palm mounted human-machine operation interface 600 may include a gripper interface 650 that is configured to couple one or more of the robotic grippers or hands 400 to the palm mounted human-machine operation interface 600. The gripper interface 650 may include an extension portion 651 that extends from the interface body 610 and a mount plate 652 that is connected to the extension portion 651. In some embodiments, the extension portion 651 and mount plate 652 are integral with the interface body 610 and in other embodiments these components are connected to the interface body 610 using any reasonable connection mechanism. The mount plate 652 includes connection holes 653 and 654 on one side of the mount plate and unillustrated corresponding connection holes on the other side of the mount plate.

The gripper interface 650 may also include a coupling member 655 that is configured to be the coupling interface with the robotic grippers or hands 400. The coupling member 655 may include a first surface 656 that connects with a coupling interface of the robotic grippers or hands 400. A second surface 657 that is on an opposite side of the coupling member 655 includes connection holes that correspond to and couple with the connection holes of the mount plate 652 using any reasonable fastener to secure the coupling member 655 to the mount plate 652. It will be appreciated that there may be different sizes of the coupling member 655 for various different types of the robotic grippers or hands 400. Accordingly, the coupling member 655 may be changed as needed to accommodate the various different types of the robotic grippers or hands 400 such as those shown in FIG. 4.

As shown in FIGS. 6A and 6B, the palm mounted human-machine operation interface 600 may include a first camera mount 660 and a second camera mount 665 that are configured to mount a camera 670 and 675, respectively. The camera mount 660 may include a mounting surface 661 that includes a connection hole 662A and a connection hole 662B. The mounting surface 661 contacts an underside of the interface body 610 so that the connection holes 662A and 662B align with connection holes 613A and 613B of the interface body 610. As shown in FIG. 6B, a fastener such as a screw is inserted into the connection holes 662A and 613A and the connection holes 662B and 613B to secure the camera mount 660 to the interface body 610.

The camera mount 660 also includes connection holes 663 and 664 on a lower side of the camera mount. The camera 670 includes mounting surface 671 that includes connection holes 672 and 673. The mounting surface 671 contacts the lower side of the camera mount 660 so that the connection holes 663 and 664 align with the connection holes 672 and 673, respectively. As shown in FIG. 6B, a fastener such as a screw is inserted into the connection holes 663 and 672 and the connection holes 664 and 673 to secure the camera 670 to the camera mount 660.

The camera mount 665 may include a mounting surface 666 that includes a connection hole 667A and a connection hole 667B. The mounting surface 666 contacts an underside of the interface body 610 so that the connection holes 667A and 667B align with connection hole 614A and an unillustrated connection hole of the interface body 610. As shown in FIG. 6B, a fastener such as a screw is inserted into the connection holes 667A and 614A to secure the camera mount 665 to the interface body 610. Although not illustrated, a fastener such as a screw is inserted into the connection holes 667B and the unillustrated connection hole of the interface body 610 to also secure the camera mount 665 to the interface body 610.

The camera mount 665 also includes connection holes 668 and 669 on a lower side of the camera mount. The camera 675 incudes a mounting surface 676 that includes connection holes 677 and 678. The mounting surface 676 contacts the lower side of the camera mount 665 so that the connection holes 668 and 669 align with the connection holes 677 and 678, respectively. As shown in FIG. 6B, a fastener such as a screw is inserted into the connection holes 668 and 677 to secure the camera 675 to the camera mount 665. Although not illustrated, a fastener such as a screw is inserted into the connection holes 664 and 673 to also secure the camera 675 to the camera mount 665.

As shown in FIGS. 6A and 6B, the palm mounted human-machine operation interface 600 may include a potentiometer interface 680 that is configured to mount one or more linear potentiometers that are used to control the operation of the robotic grippers or hands 400. In the embodiment, the potentiometer interface 680 includes sliders 681, 682, 683, and 684 that are configured to control a respective linear potentiometer 686, 687, 688, and 689. As shown in FIGS. 6A and 6B, the interface body 610 includes elongated openings 615A, 615B, 615C, and 615D that allow each of the sliders 681-684 to slide when moved by the user.

A potentiometer mount 685 is configured to mount the linear potentiometers 686-689 to the interface body 610. The potentiometer mount 685 includes elongated openings 685A, 685B, 685C, and 685D that correspond to the elongated openings 615A-615D. Each of the linear potentiometers 686-689 includes an opening on a top side for receiving the sliders 681-684. Thus, each of the linear potentiometers 681-684 is mounted to the potentiometer mount 685 using any reasonable fastener such as a screw so that its respective opening is aligned with one of the elongated openings 685A, 685B, 685C, and 685D. The potentiometer mount 685 is mounted to the interface body 610 using any reasonable fastener such as a screw so that the elongated openings 685A, 685B, 685C, and 685D align with one of the elongated openings 615A-615D. In this way, each of the sliders 681-684 may be moved by a different finger of the user, thus allowing for simultaneous control of different potentiometers. This action can be seen in FIG. 5.

As shown in FIG. 6B, an electronics circuit board 690 may be mounted to a bottom side of the interface body 610 using any reasonable mounting mechanism. It will be appreciated that the electronics circuit board 690 may include various types of electronics such as a computing device, control circuitry, and the like that can be used to control the various elements of the palm mounted human-machine operation interface 600 and the robotic gripper or hand 400 that is attached to the human-machine operation interface 600. In addition, the various electronics can be used to collect data about the usage of the palm mounted human-machine operation interface 600 and the connected robotic gripper or hand 400. In some embodiments, the electronics circuit board 690 may be protected by a heat shield.

Although not illustrated in FIGS. 6A and 6B, in some embodiments the palm mounted human-machine operation interface 600 may include a bi-directional joystick and push button that are mounted on the interface body 610. The joysticks are installed in the two flanges coming out of the interface body 610. The two small joystick mounts allow the joysticks to be installed with the sticking part pointing up and out of the holes shown in FIGS. 6A and 6B. This allows the user to slide their hands under the flanges when using the slider 681-684 as well as to control the joysticks by moving the fingers above the flanges. The bi-directional joystick and push button allow for two continuous control inputs to the electronics of the electronics circuit board 690. This can be useful when the device that is being controlled has coupled actuators that combine to provide motion to a single component. The bi-directional joystick and push button can be operated by the user's thumb while the user's four fingers are operating the sliders 681-684 as previously described.

FIG. 5 shows that in some embodiments, an arm support 601 may be coupled to the palm mounted human-machine operation interface 600 to provide further support to the user. In such embodiments, the arm support 601 may be used to provide mounting space for one or more of power electronics, external data storage, step-up converters for added power for the various robotic grippers or hands 400, and an on-board computer 602.

Without prejudice to the invention's principle, the details of construction and the embodiments may vary, even significantly, regarding what has been illustrated purely by way of non-limiting example, without departing from the scope of the disclosure, as this is defined by the annexed claims.

Not necessarily all such objects or advantages may be achieved under an embodiment of the disclosure. Those skilled in the art will recognize that the disclosure may be embodied or carried out to achieve or optimize one advantage or group of advantages as taught without achieving other objects or advantages as taught or suggested.

The skilled artisan will recognize the interchangeability of various components from different embodiments described. Besides the variations described, other known equivalents for each feature can be mixed and matched by one of ordinary skill in this art to construct the various components under principles of the present disclosure. Therefore, the embodiments described may be adapted to systems for any suitable device.

Although various embodiments of human-machine interfaces have been disclosed in certain preferred embodiments and examples, it, therefore, will be understood by those skilled in the art that the present disclosure extends beyond the disclosed embodiments to other alternative embodiments and/or uses of the system and obvious modifications and equivalents. It is intended that the scope of the present system disclosed should not be limited by the disclosed embodiments described above but should be determined only by a fair reading of the claims that follow.

What is claimed is:

1. A data collection system that performs data collection of direct human-driven robot actions for robot learning, the data collection system comprising:
   a wearable computation subsystem that is configured to be worn by a human data collector and further configured to control a data collection process by providing one or more instructions to and receiving feedback from one or more other subsystems of the data collection system;
   a wearable human-machine operation interface subsystem that is configured to be worn by the human data collector and further configured to allow the human data collector to use the wearable human-machine operation interface to operate an attached robotic gripper to perform one or more direct human-driven robot actions;
   a user interface subsystem that is configured to receive instructions from the wearable computation subsystem that instructs the human data collector to perform the one or more direct human-driven robot actions using the wearable human-machine operation interface subsystem and that is further configured to provide feedback related to the one or more direct human-driven robot actions to the wearable computation subsystem, the one or more direct human-driven robot actions for future robot learning;
a visual sensing subsystem that comprises one or more cameras that are configured to collect raw visual data related to a movement of the attached robotic gripper while performing the one or more direct human-driven robot actions; and
a data collection subsystem that is configured to receive collected data related to the one or more direct human-driven robot actions from one or more of the other subsystems of the data collection system.

2. The data collection system of claim 1, wherein the wearable computation subsystem is configured to perform at least the following four functions: 1) real-time synchronization of multiple data resources, 2) data processing, 3) creating data visualization, and 4) communication with the user interface subsystem.

3. The data collection system of claim 1, wherein the wearable human-machine operation interface subsystem is a forearm-mounted human-machine operation interface.

4. The data collection system of claim 1, wherein the wearable human-machine operation interface subsystem is a palm-mounted human-machine operation interface system.

5. The data collection system of claim 1, wherein the wearable human-machine operation interface subsystem comprises one or more sensors that are configured to measure the movement of the wearable human-machine operation interface subsystem and/or the robotic gripper directly as the one or more human-driven robot actions are performed.

6. The data collection system of claim 1, wherein the wearable human-machine operation interface subsystem comprises one or more sensors that are configured to measure one or more control signals that control the wearable human-machine operation interface subsystem and/or the robotic gripper directly as the one or more human-driven robot actions are performed.

7. The data collection system of claim 1, wherein at least one camera of the visual sensing subsystem is a bird-view camera that is mounted on a wall or a ceiling of a location where the data collection is being performed.

8. The data collection system of claim 1, wherein the one or more cameras of the visual sensing subsystem include one or more of a depth camera, a tracking camera, or an RGB camera.

9. The data collection system of claim 1, wherein the raw sensing data comprises pose data that tracks the robotic gripper in 3D space as the robotic gripper is moved when performing the one or more human-driven robot actions.

10. The data collection system of claim 1, wherein the user interface subsystem comprises a Virtual Reality/Augmented Reality (VR/AR) device and a voice user interface.

11. The data collection system of claim 10, wherein the instructions received from the wearable computation subsystem comprise visual instructions that are shown to the data collector via the VR/AR device or audio instructions that provided to the user via a voice user interface.

12. The data collection system of claim 11, wherein the visual instructions include one or more instructions to perform the one or more human-driven robot actions that are visually shown in the VR/AR device, a bounding box shown in the VR/AR device that visually identifies an object to be interacted with using the attached robotic gripper, or status information shown in the VR/AR device related to the data collection process.

13. The data collection system of claim 10, wherein the feedback from the user interface subsystem comprises one or more of a hand gesture that is tracked by the VR/AR device, an audio command received by the voice user interface, or a scan of a QR code by the VR/AR device.

14. A method of data collection of human-driven robot actions for robot learning, the method comprising:
generating using a wearable computation subsystem that is worn by a human data collector one or more instructions related to an operation of a robotic gripper that is attached to a human-machine operation interface, the one or more instructions defining one or more human-driven robot actions that the human data collector who is wearing the human-machine operation interface directly performs with the robotic gripper, the one or more human-driven actions for future robot learning;
providing the one or more instructions to a user interface subsystem that includes a Virtual Reality/Augmented Reality (VR/AR) device worn by the data collector;
collecting raw visual data from one or more cameras related to a movement of the robotic gripper directly while performing the one or more human-driven robot actions;
collecting sensor data from one or more sensors attached to the human-machine operation interface and/or the robotic gripper related to the movement of the robotic gripper directly while performing the one or more human-driven robot actions;
storing the collected raw visual data and collected sensor data in a data storage system; and
synchronizing the collected raw visual data and collected sensor data into a data set that is configured to be used to train a robot.

15. The method of claim 14, wherein the raw visual data comprises pose data that tracks the robotic gripper in 3D space as the robotic gripper is moved when performing the one or more human-driven robot actions.

16. The method of claim 14, wherein the sensor data comprises one or more control signals that control the human-machine operation interface and/or the robotic gripper directly as the one or more human-driven robot actions are performed.

17. The method of claim 14, wherein the one or more instructions include one or more of instructions to perform the one or more human-driven robot actions that are visually shown in the VR/AR device, a bounding box shown in the VR/AR device that visually identifies an object to be interacted with using the robotic gripper, or status information shown in the VR/AR device related to a data collection process.

18. The method of claim 14, wherein the wearable computation subsystem is configured to perform at least the following four functions: 1) real-time synchronization of multiple data resources, 2) data processing, 3) creating data visualization, and 4) communication with the user interface subsystem.

19. The method of claim 14, wherein the human-machine operation interface subsystem is a forearm-mounted human-machine operation interface.

20. The method of claim 14, wherein the human-machine operation interface subsystem is a palm-mounted human-machine operation interface system.

* * * * *